United States Patent [19]
Rosengaus

[11] Patent Number: 5,653,539
[45] Date of Patent: Aug. 5, 1997

[54] METHOD AND APPARATUS FOR REMOTELY MEASURING THE TEMPERATURE OF A SURFACE

[76] Inventor: Eliezer Rosengaus, 3704 Ortega Ct., Palo Alto, Calif. 94303

[21] Appl. No.: 236,404

[22] Filed: May 2, 1994

[51] Int. Cl.$^6$ .......................... G01K 11/20; G01K 3/04; G01K 3/06
[52] U.S. Cl. .......................... 374/159; 374/120; 374/137; 374/102; 250/458.1; 250/361 C; 422/52; 422/82.12; 252/962; 436/147
[58] Field of Search .................. 374/120, 159, 374/161, 137, 102; 422/52, 82.12; 436/147; 252/408.1, 962, 700; 116/207; 250/458.1, 459.1, 361 C

[56] References Cited

U.S. PATENT DOCUMENTS

| | | | |
|---|---|---|---|
| 3,735,134 | 5/1973 | Lucas | 250/337 |
| 3,775,614 | 11/1973 | Winn et al | 250/337 |
| 4,455,741 | 6/1984 | Kolodner | 374/161 |
| 4,819,658 | 4/1989 | Kolodner | 128/736 |
| 4,935,407 | 6/1990 | Luider et al. | 436/544 |

*Primary Examiner*—Diego F.F. Gutierrez

[57] ABSTRACT

A method and apparatus for measuring the temperature profile of a surface exhibiting spatial and/or temporal variations in temperature, e.g., the surface of a machine or a biological system, is disclosed. The inventive method involves forming a layer of chemiluminescent material in thermal contact with the surface. The chemiluminescent activity is selected to be a function of temperature by suitable dye choices. The resulting luminescence is detected.

13 Claims, 4 Drawing Sheets

METHOD AND APPARATUS FOR REMOTELY MEASURING THE TEMPERATURE OF A SURFACE

BACKGROUND—FIELD OF THE INVENTION

The present invention relates generally to the measurement of temperature profiles of a surface, such as the surface of electronic devices; more particularly the invention relates to the field of non-contact measurement of temperature by optical means using a chemiluminescent indicator dye.

BACKGROUND—DESCRIPTION OF PRIOR ART

The measurement of temperature his been for centuries an important goal because of the need to control industrial processes. In a number of different situations, it has been desirable to measure temperature remotely, without any physical contact between the object whose temperature is to be measured and any instrument. For example, it is desirable to be able to measure temperature remotely in situations where it is hazardous to contact the object because of extreme temperatures (such as molten metal) or where it is impractical to attach a sensing instrument due to size (as in semiconductor integrated circuits).

In the case of integrated circuits, accurate temperature measurements are an important technique for detecting defects which cause abnormal local heat dissipation. In fact, thermal measurements are the primary mechanism to detect failures or ohmic defects in the interconnection layers of an integrated circuit. These ohmic defects include short-circuits, breaks in the interconnections, thinning of the interconnections and detection of effects such as electromigration (progressive thinning of conductors due to momentum transfer from electrons flowing through them). The advantages and prior art of measuring temperature profiles in semiconductors is discussed in the patents by Kolodner (U.S. Pat. Nos. 4,455,741 and 4,819,658).

Non-contact temperature measurement by detection of blackbody radiation is commonplace today. Military applications of this technology are common, as are infrared "cameras" used for surveying the energy efficiency of buildings. The accuracy of these measurements depends on how closely an-object approximates a perfect black body (totally absorbing). For objects near room temperature (300 degrees K.), the electromagnetic spectra observed are rather flat, with maxima in the far infrared region of the electromagnetic spectrum. Since small variations in flat spectra are difficult to measure, this further compromises the accuracy of blackbody detectors for temperature measurement. Also, since the wavelengths observed are long, the spatial resolution of the temperature measurements is poor (comparable to the wavelength, in the 2 to 8 micron range). The sensors used for black body radiation sensing are typically not sensitive in the visible light region. Also, infrared lenses are typically required which are opaque in the visible light region. The combination of these limitations prevents the accurate registration of temperature profiles to small structures, such as those on an electronic integrated circuit.

Inventors have tried to circumvent the above limitations by using "active dyes". These dyes are materials that are deposited on the surface of the object whose temperature distribution is in question. The materials typically exhibit a change in one or more physical characteristics as a function of temperature.

A commonly used method used for non-contact temperature sensing in semiconductors is the use of liquid crystal dyes. These materials exhibit a phase transition at a critical temperature. The phase transition results in a change of the optical polarization properties of the dye. The typical use is to illuminate with polarized light the part under test, on whose surface the liquid crystals are deposited. The reflected light is observed through another polarizing filter. By rotating the polarization filters, a high reflection can be obtained from points where the dye is in one phase, while high attenuation is observed from points where the dye has achieved a phase transition. In this manner, dark spots can be located where the temperature exceeds the critical temperature of the particular liquid crystal under use. This does not provide a complete map of temperature on the object under study. Instead, only the location of points above a particular temperature is obtained. These liquid-crystal dyes are typically carcinogenic. The spatial resolution achievable with this method is in the order of 1 to 4 microns.

U.S. Pat. Nos. 4,455,741 and 4,819,658, both issued to Kolodner, disclose another active dye method which makes use of the change in fluorescence exhibited as a function of temperature. The dye is deposited on the object, which is then illuminated by short-wavelength radiation (typically ultraviolet). The dye fluoresces, but exhibits a change in fluorescence efficiency as the temperature varies. Although this provides an accurate thermal map of the part under study, it requires active illumination. The illumination must be very stable to compare local image brightness at two different times (stable to a fraction of 1%); this is difficult and expensive to achieve. Alternatively, secondary mechanisms for monitoring illuminator light intensity during an exposure must be added and the measurements made must be adjusted to compensate for variations in the illuminator's intensity. The illumination itself (particularly in UV) can impede the function of semiconductor circuits while they are being tested. Ultraviolet illumination sources typically generate ozone which is toxic and must be vented. Also, accurate temperature measurement typically depends on comparing two bright images and subtracting one from the other to obtain the small difference. This last step is prone to numerical error and is sensitive to instrumental noise. Other fluorescence measurements can also be made which give a temperature map; for example, the variation in the lifetime of fluorescent excited states with temperature can be used to create such a temperature map.

For integrated circuits an interesting related failure analysis technique is emission microscopy (see for example U.S. Pat. Nos. 4,680,635 and 4,755,874). The emission microscopy technique uses a low light level imaging system to detect the presence of defects in the semiconductor. The emission microscopy technique does not measure temperature changes, but rather the presence of electron-hole recombination. The sensors used for emission microscopy are typically intensified cameras or cooled CCDs. Intensified cameras couple an image intensifier to a standard CCD camera, while cooled CCD permit very long exposures (see for example U.S. Pat. Nos. 4,120,002 or 4,555,731). In either case, emission microscopes are optimized to detect very low light levels and pinpoint the emission spot by cross-registration with a standard illuminated image.

Chemiluminescence is a phenomenon where a chemical reaction occurring between two or more chemical components results in the emission of light. The typical reaction involves splitting a large organic molecule by an enzyme and emitting the excess energy as a photon. This is the chemical source of bioluminescence in many organisms, such as fireflies and deep-sea fishes. Common chemiluminescent combinations are firefly luciferin/luciferase, luminol/horseradish peroxidase, dioxetane/alkaline phosphatase and AMPP (phosporylated adenosine monophosphate)/alkaline phosphatase. These chemicals can be purchased from multiple vendors who list them in their catalogs (e.g. Sigma Chemical Co. of St Louis, Mo., or Boehringer-Manheim of Indianapolis, Ind.). Other widely available proprietary chemiluminescent dyes are marketed by American Cyanamid of Wayne, N.J. under the tradename Cyalume. Many chemical reactions are highly temperature dependent. Chemiluminescence is no exception, and the reaction rates vary with temperature. This causes the intensity of the emitted light to vary with temperature as well. From thermodynamic considerations alone, one should expect a change in reaction rates (and thus light intensity) of roughly a factor of 2 for every 10 degrees C. of temperature change.

The dependence of luminescence on temperature has been exploited as a means for quantitative measurement of chemical processes (see Luider et al, U.S. Pat. No. 4,935,407). It has also been used as a means to measure physical processes such as radiation (see Winn et al, U.S. Pat. No. 3,775,614 and Lucas, U.S. Pat. No. 3,735,134). In these applications temperature is manipulated to "read-out" the information stored locally in the dye. The present invention uses the variation of chemical activity with temperature in the dye to indirectly measure the temperature.

OBJECTS AND ADVANTAGES OF THE INVENTION

Several objects and advantages of the present invention are:

(a) To provide a temperature measurement technique which employs the temperature dependence of chemiluminescent reactions.

(b) To provide a temperature measurement technique which exhibits high temperature sensitivity.

(c) To provide a temperature measurement technique which exhibits excellent spatial resolution, better than 1 micron.

(d) To provide a temperature measurement technique which does not require expensive illuminators, optical filters, equipment to stabilize the light sources or to compensate for their intensity drift or variation in time.

(e) To provide a temperature measurement technique which is maximally compatible with existing emission microscopes.

(f) To provide a temperature measurement technique which does not require the use of carcinogenic or dangerous materials as dyes.

(g) To provide a temperature measurement technique which can be used to obtain a spatial map of the temperature of the object under observation.

(h) To provide a temperature measurement technique which is totally non-destructive, allowing the object tested to continue its manufacturing and/or sales and final use processes.

(i) To provide a temperature measurement technique which does not interfere with the electrical performance of semiconductor circuits when they are used as the device under test (hereinafter called the DUT).

SUMMARY OF THE INVENTION

The invention comprises an apparatus and method for remotely measuring the temperature of a surface by applying a chemiluminescent material to the surface and observing the light energy emitted which is responsive to the local temperature of the surface. The invention is particularly suited for the surface temperature measurement of integrated circuits (ICs). The present invention is distinguished from the prior art technique which employs a fluorescent material to make indirect temperature measurements of an IC.

First it must be understood that chemiluminescent is fundamentally different from fluorescence. Chemiluminescence arises from chemical bond creation or destruction with emission of excess energy as photons, while fluorescence is caused by de-excitation of electronic states which have been placed in an excited state by some external energy source (typically light). Accordingly, fluorescence requires external agents to supply the energy that is emitted by the dye, in the form of an active illuminator. In order to detect the fluorescence only, the illumination must be blocked from reaching the detector while the measurement is being made. This is accomplished by the use of spectral filters or time-modulated light sources. In order to get reproducible results, the illuminator intensity itself must be carefully controlled, which requires additional equipment. In contrast, chemiluminescent reactions provide intrinsic light emission, so no illuminator, blocking filter or illuminator stabilization is required. This is particularly useful because many fluorescent dyes require excitation in the ultra-violet spectrum. This requires special optics, safety precautions against eye-damage and high-cost illumination sources (e.g. arc lamps or UV lasers).

Furthermore, fluorescence detection needs to take into account the half-life of the excited fluorescent states. Unfortunately, some of the dyes exhibiting a large Stokes shift (the difference between the excitation wavelength and the emission wavelength) also have rather long half-lives. Large Stokes shifts are desirable because they allow the blockage of excess illumination by straightforward means (i.e. low cost optical filters), but long lifetimes restrict the spatial resolution of the measurements because of thermal conduction in the substrate of the material being examined and on the dye layer. Other, shorter lifetime fluorescent dyes are often somewhat toxic. In contrast, many chemiluminescent dyes are based on chemicals naturally present in living organisms, and many are non-toxic. Also, the reaction rates in chemiluminescent change very significantly as the temperature is changed; this can be used to minimize the effects of thermal conduction in the materials being observed.

The advantages of chemiluminescent over fluorescence discussed in the above two paragraphs show that chemiluminescent temperature measurement systems are much lower cost than fluorescence systems, with equal or superior spatial resolution and excellent time response. Also, emission microscopes, already optimized for the detection of intrinsic light emission from semiconductors can be used with little or no change to measure temperature profiles.

Further objects and advantages are to provide a temperature measurement technique which can be used to obtain the time history of temperature at a desired point instead of a full two-dimensional temperature map. Still further objects and advantages will become apparent from a consideration of the ensuing description and drawings.

REFERENCE NUMERALS IN DRAWINGS

Figure 1:
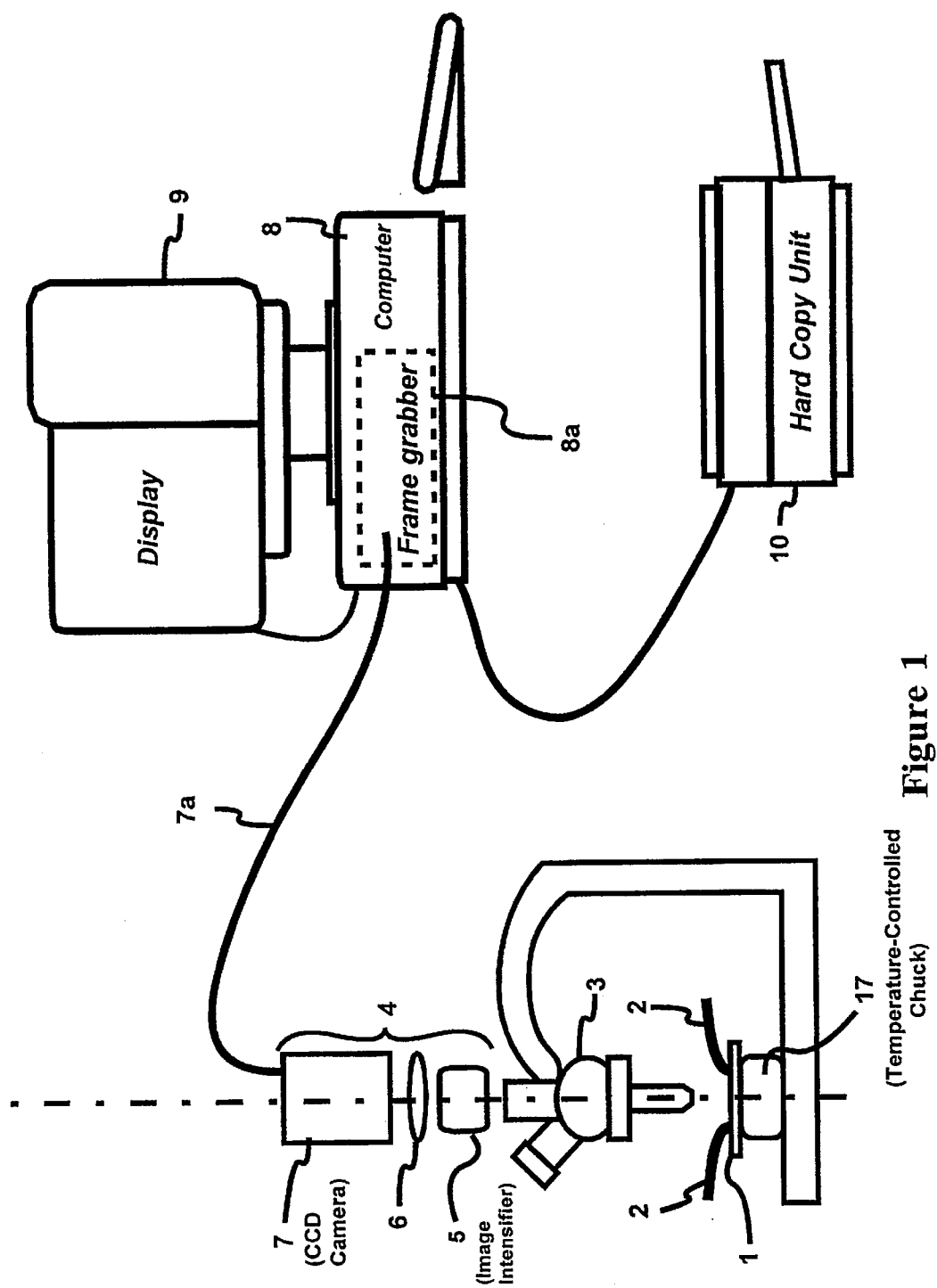
FIG. 1 is a schematic system diagram of an embodiment of the invention, which shows the system components used for obtaining a spatial temperature map of the surface of a small object under study.

1 Device under test (DUT)
2 Power leads
3 Microscope
4 CCD Camera Assembly
5 Image Intensifier
6 Lens or fiber-optic coupling
7 CCD camera
7a a Connecting cable
8 Computer
8a a Frame grabber
9 Computer monitor
10 Hard copy unit
11 Two tailed Fiber optic
12 Photomultiplier tube
13 Preamplifier
14 Analog to digital converter
15 Chemiluminescent dye
16 Illuminator
17 Heat sink or Temperature controlled chuck
18 Dichroic beam splitter
19 Temperature controlled pincers

DETAILED DESCRIPTION OF THE BEST MODE

The following detailed description illustrates the invention by way of example, not by way of limitation of the principles of the invention. This description will clearly enable one skilled in the art to make use of the invention, and describes several embodiments, adaptations, variations, alternatives and uses of the invention, including what I presently believe is the best mode of carrying out the invention.

A typical embodiment of a system configured to obtain the temperature map on the surface of an integrated circuit using the present invention is shown in FIG. 1. The DUT 1 is positioned under a microscope 3 equipped with a microphotographic port. An intensified CCD camera assembly 4 consisting of an image intensifier 5 coupled to a CCD camera 7 via lenses or fiber optics 6 is attached to the microphotography port of microscope 3. The TV signal obtained by the CCD 7 is delivered via cable 7a to a frame grabber 8a which digitizes the image and stores it as an array of numbers in the memory of the computer 8. The computer 8 manipulates the array of numbers representing the image and displays the results again as an image on its monitor 9. Alternatively the computer 8 stores the image digitally on magnetic media or sends the array of numbers in suitable format to the hard copy unit 10 (which typically is a graphics printer). The computer 8 typically also controls the application of power to the power leads 2 of the DUT 1 (not shown). This permits the computer to accurately synchronize the application of power and/or other signals to the DUT 1 and the process of acquiring the image.

In accordance with the method aspects of the invention, the DUT 1 is coated with a thin uniform layer of a chemiluminescent dye 15. The microscope 3 typically contains an illuminating device, which permits the observation of the DUT 1 in reflected light. The illuminating device can be turned off allowing the observation of the DUT 1 in emitted light only. Such emitted light comes either from the DUT 1 itself because of electron-hole recombination or brehmstrallung, or from the chemiluminescent dye 15. In the preferred embodiment, the DUT 1 sits atop a temperature controlled chuck 17. In this way the temperature of the DUT 1 can be manipulated by adjusting the temperature controlled chuck 17. The temperature controlled chuck 17 is preferably equipped with a thermoelectric (Peltier effect) cooler and/or an electrical resistor to cool and/or heat the object.

From the description above it is apparent that the apparatus used for temperature measurement using the present invention is similar to that used for emission microscopy as disclosed by Khurana in U.S. Pat. No. 4,680,635. This allows a single instrument to be built which is capable of both emission microscopy and temperature measurement. Distinction between intrinsic emission and chemiluminescent can usually be made by the use of spectrally selected filters in the optical path of the image collected.

Figure 2:
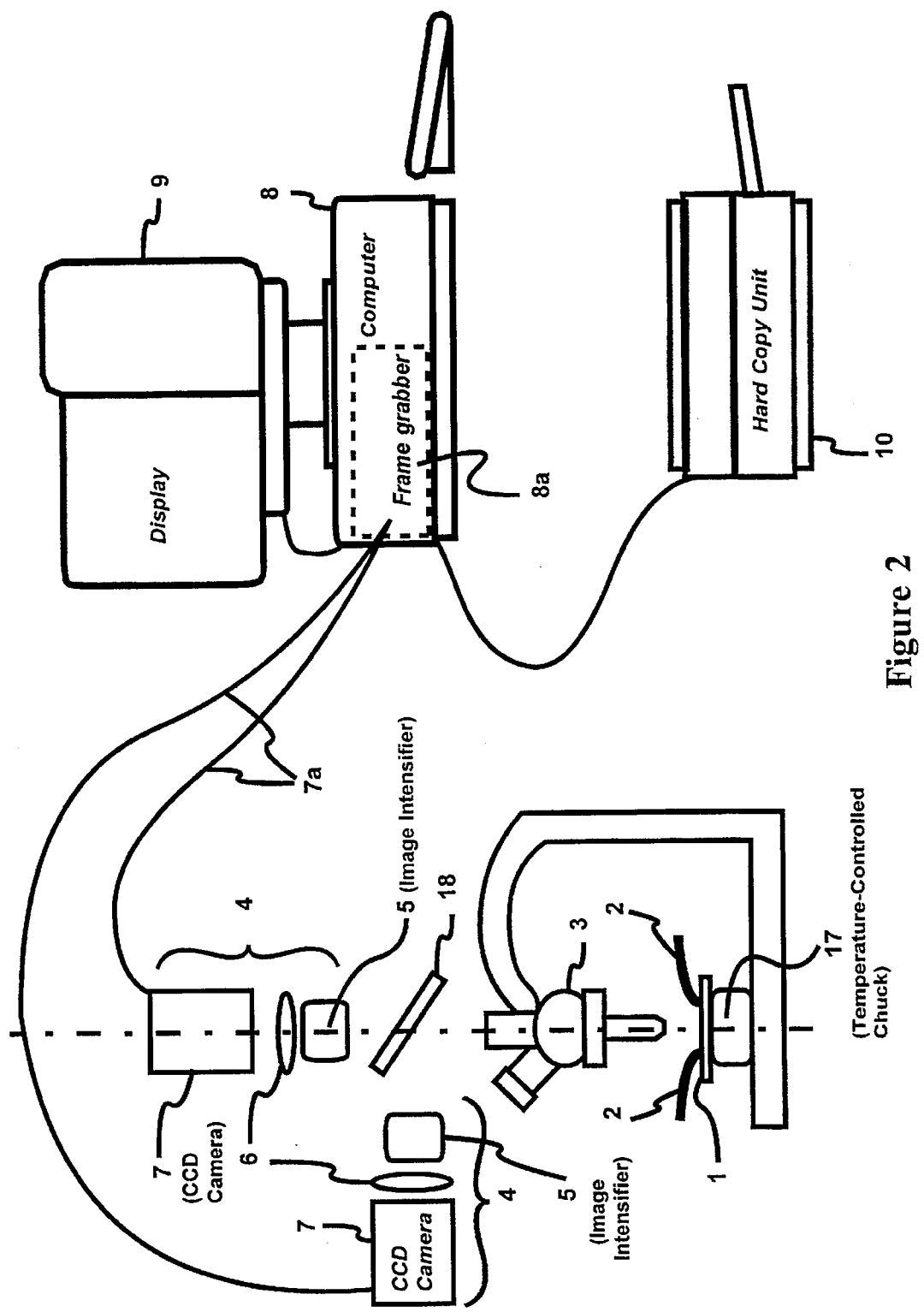
FIG. 2 is a schematic system diagram of an alternate embodiment of the invention, which shows the system components used for dual-channel operation, where each channel is sensitive to a different wavelength of emitted light.

FIG. 2 shows an alternate embodiment of the system apparatus of FIG. 1 which is additionally capable of simultaneous detection of light emitted at two different wavelengths. This is accomplished by splitting the light collected by microscope 3 with a dichroic beam splitter 18 and directing each portion of the light thus split into a different sensor, such as the CCD camera assembly 4 of FIG. 1.

Figure 3:
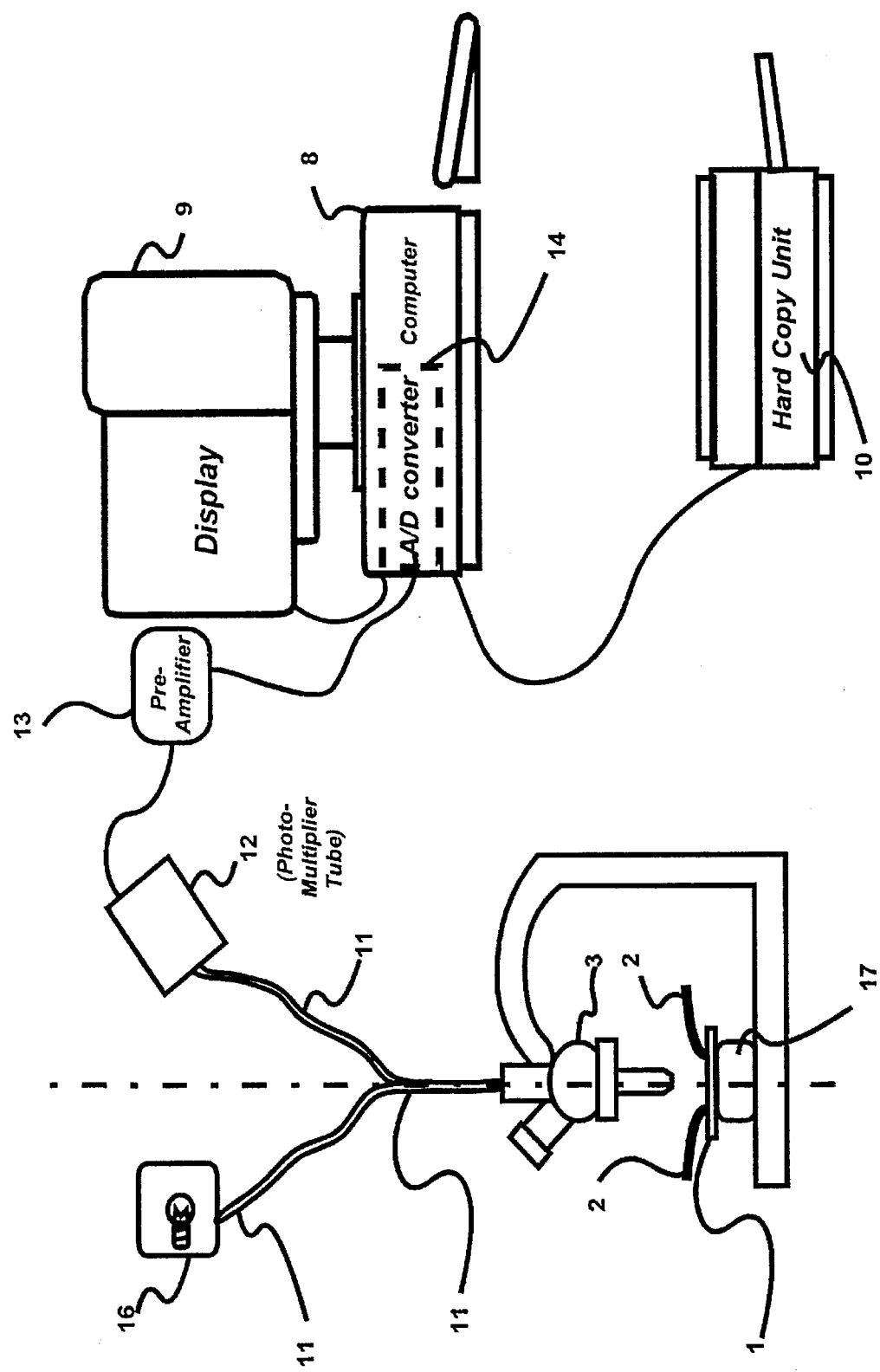
FIG. 3 is a schematic system diagram of another alternate embodiment of the invention, which shows the system components used for obtaining time histories of temperature at a single point on the object under study.

FIG. 3 shows another embodiment of the invention configured to obtain the time history of temperature at a single point. Again the DUT 1 is positioned under microscope 3, but now an optical fiber 11 of a suitably small diameter is positioned at the imaging plane of the microphotographic port. This fiber is preferably split into two tails; one going to an illuminator 16 and another one attached to the photocathode of a photomultiplier tube 12. The photomultiplier tube 12 provides a signal which is amplified by preamplifier 13 and fed to a analog-to-digital converter 14 (shown in phantom) inside the computer 8. The stream of readings obtained by the analog-to-digital converter is stored in the computer's memory. The computer 8 controls the signals to the DUT 1 in the same manner as the embodiment of FIG. 1 described above. The bifurcation of optical fiber 11 permits the projection of a target dot on the DUT 1 to visualize the region being used for temperature measurement through the eyepieces of microscope 3. This is accomplished by turning on illuminator 16 temporarily while manipulating the DUT 1 for position and focus. Alternatively, the optical fiber 11 can be non-bifurcated and a registration of the region of interest to crosshairs on the microscope's eyepieces can be made by temporarily decoupling the fiber from the photomultiplier tube 12 and inserting it into illuminator 16.

From the description above, it is clear that the embodiment of FIG. 3 can be much less expensive to implement than that of FIG. 1 due to the lower cost of the photomultiplier tube 12 and Analog to Digital converter 14 compared to the image intensifier 5, CCD camera 7 and frame grabber 8a. Since spatial resolution is related to temperature resolution by the intrinsic heat conduction on the DUT 1, obtaining a time history at a number of discrete points can be advantageous to increase the localization of heat dissipating defects on the DUT 1. For a minimal cost system, the Analog to Digital converter 14 and the computer 8 can be replaced by a voltage measurement device such as an oscilloscope, chart recorder or voltmeter.

The first step in the process of temperature measurement is to prepare a chemiluminescent dye. The dyes are typically supplied as kits containing two or more chemicals that must be mixed together in a liquid solution to initiate the chemiluminescent reaction.

Figure 4:
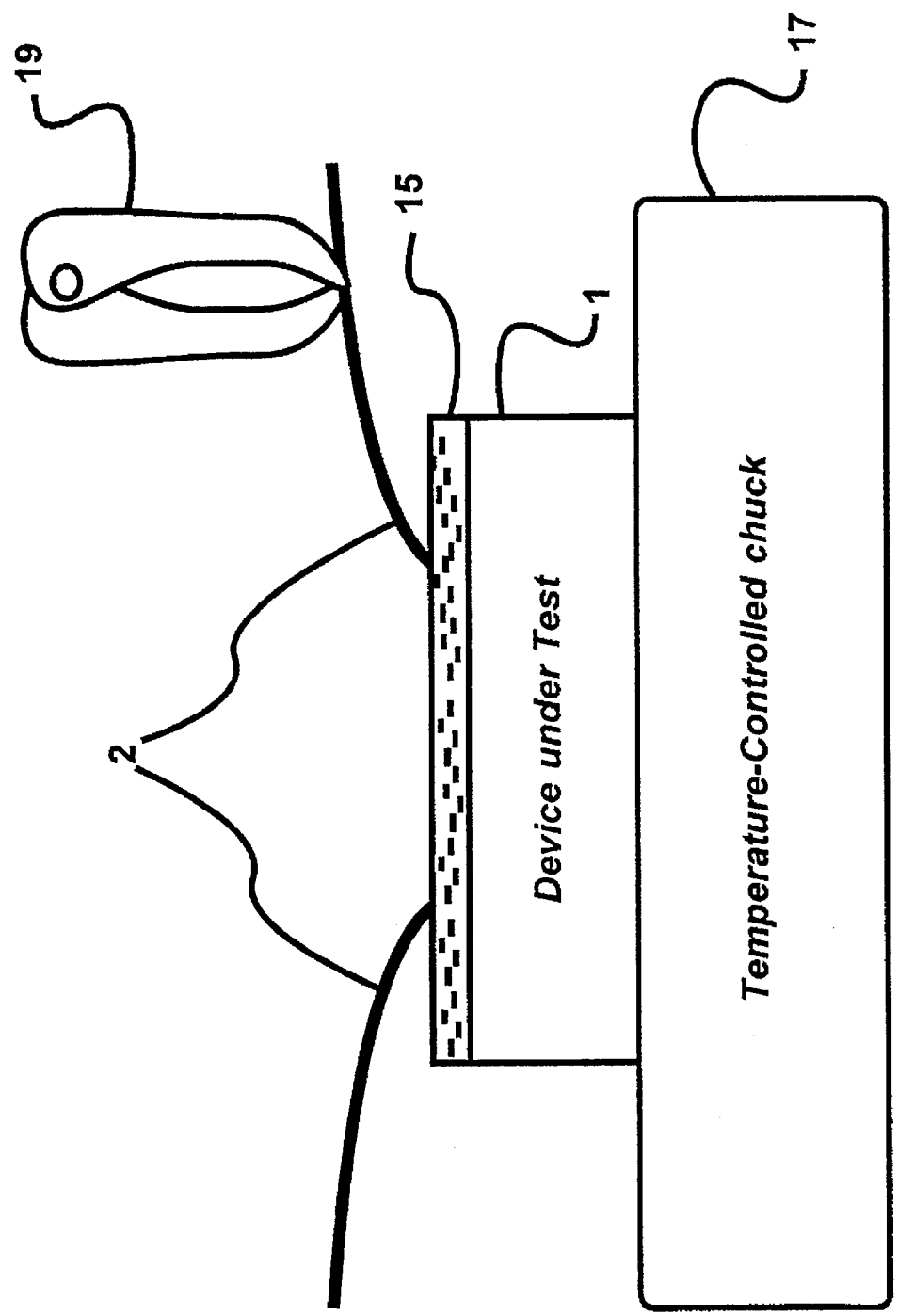
FIG. 4 shows a detail of the object under study with a chemiluminescent dye deposited on it.

As shown in FIG. 4, the DUT 1 is connected to suitable power or signal leads. It is advantageous to have the signals to these leads controlled by the computer 8. The DUT 1 is coated with a thin layer of chemiluminescent dye 15. This can be accomplished by simply relying on surface tension of a liquid dye, or by actively using centrifugal force to thin the dye layer. In the latter case, typically used on integrated circuits in a full wafer stage, the wafer is spun to accomplish the desired thinning.

By positioning the DUT 1 under the microscope 3 of FIG. 1 and activating the microscope's illuminating device, the area of interest in the DUT can be located and focus can be adjusted. Magnification can be selected by changing the objectives of the microscope 3. An image can be obtained at this point from the CCD camera 7 and stored in the memory of the computer 8. This image, which we shall call the illuminated image can later be used to cross-register the temperature map of the DUT 1 to visible structures on the Integrated circuits.

As shown in FIG. 4, the DUT 1 is mounted on a heat sink or temperature controlled chuck 17. The DUT 1 is allowed to come to thermal equilibrium with the temperature controlled chuck 17. This ensures that the temperature is uniform across the DUT 1. The microscope's illuminator is then turned off. With the power to the device still off, a reference image is obtained on the CCD camera 7 and stored in the memory of the computer 8. This reference image allows the correction for nonuniformities of the thickness of the chemiluminescent dye. The DUT 1 is then energized through power leads 2, causing heat to be dissipated on the structure of the integrated circuits on the DUT 1. A second image, which we shah call the powered image, is then obtained on the CCD camera 7 and stored in the memory of the computer 8. This image typically shows an increase in brightness, such brightness being exaggerated in the regions of higher temperature on the DUT. The reference image can be digitally subtracted from the powered image, thus obtaining a map of the changes in brightness caused by heat dissipation on the DUT. The brightness can be interpreted as temperature changes.

An absolute temperature determination can be made by turning off the power to the DUT 1 and varying the temperature of the temperature controlled chuck 17 while acquiring images of the DUT 1 through the CCD camera 7. A minimum of two such images at different temperatures is obtained. This allows a numerical interpolation to be made correlating the local brightness of the image to a particular temperature.

The temperature map can be displayed as an image and displayed as a false-color overlay on the reflected image. This allows the identification of the points on the DUT which exhibit heat dissipation. Comparisons between different DUTs can be made by cross-registering the reflected images of each and comparing the local temperature maps. This permits the determination of abnormalities in heat dissipation typically caused by defects in the conducting paths of the DUT.

An alternative method for determining the absolute temperature profile of a surface is to use chemiluminescent materials whose spectrum changes as a function of temperature. The easiest way to achieve this is to use a mixture of two or more chemiluminescent dyes, each with a different peak in its emission spectrum and a different temperature response curve. Intensity measurements can be made at two different wavelengths corresponding to the emission peaks; the ratio of these measurements will be independent of dye thickness, and will be an accurate estimation of absolute temperature. This technique is similar to that proposed by Wickersheim for fluorescent dyes (see, for example, U.S. Pat. Nos. 4,075,493 and 4,215,275). The observations can be made sequentially in time with a single detector and different pass-band filters, or in parallel, using two detectors with suitable pass-band filters or dichroic beam splitters in front of them. Detailed spectral measurements can also be made by using a spectrometer or monochromator, which typically use diffraction gratings or prisms to split light into its spectral components, and then detecting the resulting spectrum with suitable sensors (photographic film, CCD arrays, photodiode arrays, etc.). FIG. 2 shows a two-channel system using a dichroic beam splitter 18 to isolate each channel. The operation of each channel is similar to the one described above for FIG. 1. A ratio of the measurements for each channel provides the desired absolute temperature measurement, provided the temperature response curves for each channel are known. For this method to work, it is required that the emission of light at each wavelength have a different temperature response; this can be seen to happen at certain critical temperatures (depending on the specific dyes used) where the enzymatic activity in the dye breaks down rapidly.

The operation of the embodiment in FIG. 3 follows the same sequence as that of FIG. 1, except that instead of images a single intensity value is obtained from the photomultiplier tube 12. The ability to read out the signals from the photomultiplier tube quickly permits the construction of a detailed brightness history at the point of interest as power or signals are applied to the DUT 1, with potential time resolution of microseconds or better.

An interesting application of the techniques described above is the inspection of the quality of the bonds used to attach power and signal leads to the Integrated circuits. For this application, the leads are held with an optional heated pincer 19 shown in FIG. 4. The flow of heat to the bulk of the integrated circuit is then measured by taking the time history of temperature at one or more points on the surface of the integrated circuit which has been suitably coated with chemiluminescent dye. Alternatively the process can be reversed, with heat being applied to the semiconductor and the temperature of the leads suitably covered with chemiluminescent dye being measured.

Although the description above contains many specifities, these should not be construed as limiting the scope of the invention but as merely providing illustrations of some of the presently preferred embodiments of this invention. For example, the method of this invention can be applied to any object other than semiconductor integrated circuits, including but not limited to biological samples and inaccessible parts of a chemical or mechanical apparatus. Also, alternative optical trains can be used to collect the light emitted by the chemiluminescent dyes; instead of traditional microscopes, other combinations of lenses, mirrors and optical fibers can be used. The use of image-intensifiers as part of the detector is advantageous because it allows for short exposures; this translates to good spatial resolution since there would not be a long time during an exposure for heat to diffuse by conduction. For certain applications where spatial resolution and heat conduction are not critical, the image intensifier can be eliminated, and a long exposure on a cooled CCD camera or even photographic film will provide the desired temperature profile.

It is clear that alternative image sensors to those described in the preferred embodiments above can be used. Such sensors include but are not limited to PIN diodes, avalanche photodiodes, focal plane arrays of photo detectors or low-light variants of the image intensifier which read-out directly as electrical signals. The latter have been named MAMA tubes (multi-anode microchannel-plate arrays) or Mepsicron tubes. Also, vidicon tube video cameras as well as SIT (Silicon Target) or ISIT (Intensified Silicon Target) can be used as sensors for chemiluminescent microthermography. Photographic film can also be used (with or without the use of image intensifiers), and analysis can be made by measuring the optical density of the film with a densitometer.

It is also apparent that the techniques described above can be used to inspect the quality of thermal coupling between two materials. In many cases the area of such coupling may not be accessible to visual inspection. Temperature measurements of an accessible surface while heat is applied at a known point yield and estimation of the thermal coupling of the materials. This is the basis for the application described above to wire-bond inspection in semiconductors.

Thus, from the above discussion, it is clear that various modifications within the scope of this invention can be made by one with ordinary skill in the art without departing from the spirit thereof. I therefore wish my invention to be defined by the scope of the appended claims as broadly as the prior art will permit, and in view of the specification if need be.

I claim:

1. Method for measuring the temperature of a surface which exhibits variations selected from the group consisting of spatial variations and temporal variations, said method comprising the steps of
    a) applying a layer of at least one chemiluminescent material in thermal contact with said surface, the chemiluminescent of said material varying as the temperature of said surface varies;
    b) measuring the chemiluminescent emitted from said chemiluminescent layer;
    c) measuring the temperature of each point on said surface by comparing the measured intensity of chemiluminescence at said point with reference chemiluminescence intensifies.

2. The method of claim 1 wherein said step of measuring the chemiluminescence emitted from said chemiluminescent layer includes the step of:
    directing the chemiluminescence emitted by the chemiluminescent material to a light sensitive detector.

3. The method of claim 2 wherein said directing the chemiluminescence emitted step includes using optical devices selected from the group consisting of optical fibers, lenses and mirrors.

4. The method of claim 2 wherein the temperature of the surface is established by comparing the intensity of luminescence at a plurality of wavelengths.

5. The method of claim 1 wherein the chemiluminescent layer includes a mixture of a plurality of chemiluminescent materials.

6. The method of claim 1 which includes the additional step of establishing said reference chemiluminescence intensities by using a temperature-controlled heat sink to manipulate the temperature of said surface to calibrate the detected emitted chemiluminescent intensities as a function of temperature.

7. The method of claim 1 wherein said measuring the chemiluminescence emitted step includes:
    generating an image of the surface to obtain a spatial temperature profile of the surface.

8. The method of claim 1 wherein said measuring the chemiluminescence emitted step includes:
    generating a time history of the chemiluminescence intensity of a region of the surface.

9. The method of claim 1 wherein the surface to be measured is the surface of a semiconductor integrated circuit.

10. An apparatus for measuring the temperature of a surface, said temperature exhibiting variations selected from the group consisting of spatial variations and spatial variations, comprising:
    a) a layer, including at least one chemiluminescent material, capable of being positioned in thermal contact with said surface, the chemiluminescence of said material varying as the temperature of said surface varies;
    b) an optical collector collecting the chemiluminescence emitted by said chemiluminescent material;
    c) a light detector responsive to said optical collector for detecting the intensity of the chemiluminescence emitted by said material;
    d) means for measuring the temperature of each point on said surface by comparing the intensity of chemiluminescence emitted at each said point with reference chemiluminescence intensities.

11. The apparatus of claim 10 wherein said light detector includes a device selected from the group consisting of CCD cameras, SIT cameras, ISIT cameras, photographic cameras and vidicon tube cameras.

12. The apparatus of claim 10 wherein said light detector includes an image intensifier.

13. The apparatus of claim 10 wherein said light detector includes a device selected from the group consisting of photomultiplier tubes, PIN diodes and avalanche photodiodes.

* * * * *